(12) United States Patent
Kwon et al.

(10) Patent No.: US 9,059,473 B2
(45) Date of Patent: Jun. 16, 2015

(54) CABLE-TYPE SECONDARY BATTERY

(71) Applicant: LG Chem, Ltd., Seoul (KR)

(72) Inventors: Yo-Han Kwon, Daejeon (KR);
Sung-Kyun Chang, Daejeon (KR);
Byung-Hun Oh, Daejeon (KR);
Je-Young Kim, Daejeon (KR);
Dong-Sub Jung, Daejeon (KR);
Sang-Wook Woo, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/190,211

(22) Filed: Feb. 26, 2014

(65) Prior Publication Data

US 2014/0178727 A1    Jun. 26, 2014

Related U.S. Application Data

(63) Continuation of application No. PCT/KR2012/010934, filed on Dec. 14, 2012.

(30) Foreign Application Priority Data

Dec. 14, 2011 (KR) ......................... 10-2011-0134702
Dec. 14, 2012 (KR) ......................... 10-2012-0146127

(51) Int. Cl.
*H01M 10/0565* (2010.01)
*H01M 10/0564* (2010.01)
(Continued)

(52) U.S. Cl.
CPC .......... *H01M 10/0431* (2013.01); *H01M 10/05* (2013.01); *H01M 10/0565* (2013.01); *H01M 10/058* (2013.01); *H01M 2300/0082* (2013.01); *H01M 2300/0094* (2013.01); *H01M 6/44* (2013.01)

(58) Field of Classification Search
None
See application file for complete search history.

(56) References Cited

U.S. PATENT DOCUMENTS 5,437,942 A * 8/1995 Murata et al. ................. 429/312
6,150,455 A   11/2000 Takamiya et al.
(Continued)

FOREIGN PATENT DOCUMENTS

CN    1610170 A    4/2005
CN    102035043 A  4/2011
(Continued)

OTHER PUBLICATIONS

International Search Report for PCT/KR2012/010934 mailed on Apr. 22, 2013.

*Primary Examiner* — Cynthia K Walls
(74) *Attorney, Agent, or Firm* — Lerner, David, Littenberg, Krumholz & Mentlik, LLP (57) ABSTRACT

The present invention relates to a cable-type secondary battery comprising a polymer electrolyte having a first electrolyte layer comprising a mixture of a first polymer and a first organic electrolyte solution in a weight ratio of 50:50 and 80:20; and a second electrolyte layer formed on at least one surface of the first electrolyte layer and comprising a mixture of a second polymer and a second organic electrolyte solution in a weight ratio of 20:80 and 50:50. Since the multiple-layered polymer electrode film of the present invention exhibits good characteristics in terms of both mechanical property and ionic conductivity, the cable-type secondary battery comprising the same according to the present invention has superior battery performances and flexibility, as well as good strength for withstanding external impact.

13 Claims, 4 Drawing Sheets

(51) Int. Cl.
*H01M 10/04* (2006.01)
*H01M 10/05* (2010.01)
*H01M 10/058* (2010.01)
*H01M 6/44* (2006.01)

(56) References Cited

U.S. PATENT DOCUMENTS

| | | |
|---|---|---|
| 2003/0180623 A1 | 9/2003 | Yun et al. |
| 2004/0214089 A1 | 10/2004 | Lee et al. |
| 2005/0147857 A1 | 7/2005 | Crumm et al. |
| 2010/0203372 A1 | 8/2010 | Kim et al. |
| 2011/0117414 A1 | 5/2011 | Choi et al. |
| 2011/0143202 A1 | 6/2011 | Farmer et al. |
| 2011/0281175 A1 | 11/2011 | Hudson et al. |
| 2012/0009331 A1 | 1/2012 | Kwon et al. |
| 2012/0015233 A1 | 1/2012 | Kwon et al. |
| 2012/0058376 A1 | 3/2012 | Kwon et al. |
| 2012/0148902 A1 | 6/2012 | Kwon et al. |

FOREIGN PATENT DOCUMENTS

| | | |
|---|---|---|
| EP | 1282187 | 2/2003 |
| EP | 2533328 A2 | 12/2012 |
| JP | 10-144137 A | 5/1998 |
| JP | 2001-110244 A | 4/2001 |
| JP | 2001110445 A | 4/2001 |
| KR | 10-2011-0090768 | 8/2011 |
| KR | 20110089583 A | 8/2011 |
| KR | 20110089819 A | 8/2011 |
| WO | 9837589 A1 | 8/1998 |
| WO | 2011/035689 A1 | 3/2011 |
| WO | 2011145882 A2 | 11/2011 |

\* cited by examiner

CABLE-TYPE SECONDARY BATTERY

CROSS-REFERENCE TO RELATED APPLICATION

This application is a continuation of International Application No. PCT/KR2012/010934 filed on Dec. 14, 2012, which claims priority under 35 USC 119(a) to Korean Patent Application No. 10-2011-0134702 filed in the Republic of Korea on Dec. 14, 2011 and Korean Patent Application No. 10-2012-0146127 filed in the Republic of Korea on Dec. 14, 2012, the disclosures thereof are incorporated herein by reference.

TECHNICAL FIELD

The present invention relates to a cable-type secondary battery, which can freely change in shape, and more particularly to a cable-type secondary battery comprising an electrolyte layer having good mechanical property and superior ionic conductivity.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape. Also, in the case of an electrolyte used in such a secondary battery, a suitable material having superior ionic conductivity without the problem of leakage is required.

In conventional electrochemical devices using an electrochemical reaction, a liquid electrolyte, particularly, an ion-conductive electrolyte in the form of an organic solution obtained by dissolving a salt in a non-aqueous organic solvent has been widely used as an electrolyte. However, the use of the liquid electrolyte may cause degradation of an electrode material, volatility rise of an organic solvent, safety-related problems such as combustion due to an increase in the ambient temperature and in the temperature of a battery itself, leakage, and difficulty in the preparation of an electrochemical device in various forms. In order to overcome safety problems due to the use of such a liquid electrolyte, polymer electrolytes such as a gel polymer electrolyte and a solid polymer electrolyte have been proposed. Generally, the safety of an electrochemical device increases in the order of a liquid electrolyte<a gel polymer electrolyte<a solid polymer electrolyte, whereas the performance thereof decreases in the same order. It is known that batteries using the solid polymer electrolyte cannot be commercialized due to the poor performances thereof. Meanwhile, the gel electrolyte in comparison to the liquid electrolyte has low ionic conductivity, poor mechanical property, and may also leak.

In addition, with the recent development of mobile devices, there is a need for a cable-type secondary battery which can freely change in shape. In the case of the cable-type secondary battery, an electrolyte layer tends to be damaged due to the repeated use of the battery, from which a short circuit between electrodes may occur. In order to solve this problem, an electrolyte having good mechanical property is required. However, since the mechanical property of the electrolyte and the ionic conductivity thereof have an inconsistent relationship, there exists a problem in that if the mechanical property of the electrolyte increases, the ionic conductivity thereof may decrease.

DISCLOSURE

Technical Problem

The present invention is designed to solve the problems of the prior art, and therefore it is an object of the present invention to provide a cable-type secondary battery comprising an electrolyte layer having good mechanical property together with superior ionic conductivity.

Technical Solution

In order to achieve the object, the present invention provides a cable-type secondary battery, comprising: an inner electrode having an open-structured inner current collector and an inner electrode active material layer coated on the surface of the inner current collector; an electrolyte layer surrounding the inner electrode, the electrolyte layer being a polymer electrolyte film; an outer electrode having an outer electrode active material layer surrounding the outer surface of the electrolyte layer and an outer current collector surrounding the outer electrode active material layer; and a protection coating disposed to surround the outer electrode, wherein the polymer electrolyte film has a first electrolyte layer comprising a mixture of a first polymer and a first organic electrolyte solution in a weight ratio of 50:50 and 80:20; and a second electrolyte layer formed on at least one surface of the first electrolyte layer and comprising a mixture of a second polymer and a second organic electrolyte solution in a weight ratio of 20:80 and 50:50.

The first polymer may be a non-crosslinked polar polymer, and preferred examples of the non-crosslinked polar polymer which may be used in the present invention include, but are not particularly limited to, polyacrylonitrile, polyvinyl chloride, polyvinylidene fluoride, polyvinylidene fluoride-hexafluoropropylene copolymer, polyethyleneimine, polymethyl metacrylate, polybutyl acrylate, polyvinyl pyrrolidone, polyvinyl acetate, and ethylene-vinyl acetate copolymer.

Also, the second polymer may be a non-crosslinked polar polymer, a non-crosslinked oxide-based polymer, or a crosslinked polymer structure.

Preferred examples of the non-crosslinked polar polymer which may be used in the present invention include, but are not particularly limited to, polyacrylonitrile, polyvinyl chloride, polyvinylidene fluoride, polyvinylidene fluoride-hexafluoropropylene copolymer, polyethyleneimine, polymethyl metacrylate, polybutyl acrylate, polyvinyl pyrrolidone, polyvinyl acetate, and ethylene-vinyl acetate copolymer.

Examples of the non-crosslinked oxide-based polymer include polyethylene oxide, polypropylene oxide, polyoxymethylene, and polydimethylsiloxane, but are not particularly limited thereto.

The crosslinked polymer structure may be a polymer consisting of a monomer having two or more functional groups or a polymer consisting of a monomer having two or more functional groups and a polar monomer having one functional group.

Preferred examples of the monomer having two or more functional groups which may be used in the present invention include, but are not particularly limited to, trimethylolpropane ethoxylate triacrylate, polyethylene glycol dimethacrylate, polyethylene glycol diacrylate, divinyl benzene, polyester dimethacrylate, divinyl ether, trimethylolpropane, trimethylolpropane trimethacrylate, and ethoxylated Bisphenol A dimethacrylate.

Examples of the polar monomer having one functional group which may be used in the present invention include methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride, but are not particularly limited thereto.

In the present invention, it is preferred that the organic electrolyte solutions contain a lithium salt, and examples of the lithium salt which may be used in the present invention include, but are not particularly limited to, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, and lithium tetraphenylborate.

Also, examples of the organic electrolyte solutions which may be used in the present invention include ethylene carbonate, propylene carbonate, butylene carbonate, vinylene carbonate, diethyl carbonate, dimethyl carbonate, ethyl methyl carbonate, γ-butyrolactone, sulfolane, methyl acetate, and methyl propionate, but are not particularly limited thereto.

The inner electrode may be formed with two or more electrodes arranged in parallel to each other.

In the present invention, the inner electrode may be an anode and the outer electrode, a cathode, or the inner electrode may be a cathode and the outer electrode, an anode.

The open-structured inner current collector may be in the form of a wound wire or a mesh.

The open-structured inner current collector may further comprise a core for supplying lithium ions, the core comprising an electrolyte therein.

The outer current collector may be in the form of a pipe, a wound wire or a mesh.

Advantageous Effects

The multiple-layered polymer electrode film of the present invention comprises a first electrolyte layer having good mechanical property and flexibility and a second electrolyte layer having superior ionic conductivity due to an excessive amount of an organic electrolyte solution comprised therein, to exhibit good characteristics in terms of both mechanical property and ionic conductivity. Accordingly, the cable-type secondary battery comprising such a multiple-layered polymer electrode film has superior battery performances and flexibility, as well as good strength for withstanding external impact.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
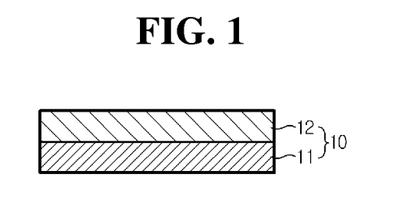
FIG. 1 shows a cross-section of a polymer electrolyte film according to a preferred embodiment of the present invention.
Figure 2:
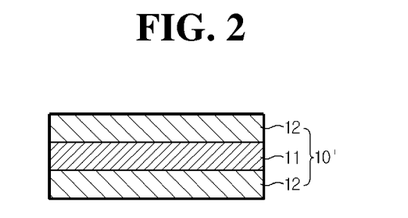
FIG. 2 shows a cross-section of a polymer electrolyte film according to another preferred embodiment of the present invention.

FIGS. 1 and 2 schematically show polymer electrolyte films according to preferred embodiments of the present invention. However, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

The cable-type secondary battery of the present invention comprises an inner electrode having an open-structured inner current collector and an inner electrode active material layer coated on the surface of the inner current collector; an electrolyte layer surrounding the inner electrode, the electrolyte layer being a polymer electrolyte film; an outer electrode having an outer electrode active material layer surrounding the outer surface of the electrolyte layer and an outer current collector surrounding the outer electrode active material layer; and a protection coating disposed to surround the outer electrode, wherein the polymer electrolyte film has a first electrolyte layer comprising a mixture of a first polymer and a first organic electrolyte solution in a weight ratio of 50:50 and 80:20; and a second electrolyte layer formed on at least one surface of the first electrolyte layer and comprising a mixture of a second polymer and a second organic electrolyte solution in a weight ratio of 20:80 and 50:50.

Referring to FIGS. 1 and 2, the polymer electrolyte film 10, 10' of the present invention has a first electrolyte layer comprising a mixture of a first polymer and a first organic electrolyte solution in a weight ratio of 50:50 and 80:20; and a second electrolyte layer 12 formed on at least one surface of the first electrolyte layer 11 and comprising a mixture of a second polymer and a second organic electrolyte solution in a weight ratio of 20:80 and 50:50.

Such a polymer electrolyte film 10, 10' has good characteristics in terms of both mechanical property and ionic conductivity. The first electrolyte layer 11 has good flexibility and mechanical property, but is insufficient in terms of ionic conductivity. Such an insufficient ionic conductivity can be reinforced by the second electrolyte layer 12 containing an excessive amount of an organic electrolyte solution, which is used to improve the ionic conductivity of the whole polymer electrolyte film 10, 10'. That is, the organic electrolyte solution contained in the second electrolyte layer 12 in an excessive amount is diffused into electrodes to contribute to the formation of the overall ion-conductive path within the battery.

In the present invention, the first polymer which may be a non-crosslinked polar polymer, and the second polymer may be a non-crosslinked polar polymer, a non-crosslinked oxide-based polymer, or a crosslinked polymer structure.

Preferred examples of the non-crosslinked polar polymer which may be used in the present invention include, but are not particularly limited to, polyacrylonitrile, polyvinyl chloride, polyvinylidene fluoride, polyvinylidene fluoride-hexafluoropropylene copolymer, polyethyleneimine, polymethyl metacrylate, polybutyl acrylate, polyvinyl pyrrolidone, polyvinyl acetate, and ethylene-vinyl acetate copolymer.

Examples of the non-crosslinked oxide-based polymer which may be used in the present invention include polyethylene oxide, polypropylene oxide, polyoxymethylene, and polydimethylsiloxane, but are not particularly limited thereto.

The crosslinked polymer structure may be a polymer consisting of a monomer having two or more functional groups or a polymer consisting of a monomer having two or more functional groups and a polar monomer having one functional group.

Preferred examples of the monomer having two or more functional groups which may be used in the present invention include, but are not particularly limited to, trimethylolpropane ethoxylate triacrylate, polyethylene glycol dimethacrylate, polyethylene glycol diacrylate, divinyl benzene, polyester dimethacrylate, divinyl ether, trimethylolpropane, trimethylolpropane trimethacrylate, and ethoxylated Bisphenol A dimethacrylate.

Examples of the polar monomer having one functional group which may be used in the present invention include methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride, but are not particularly limited thereto.

In the present invention, it is preferred that the organic electrolyte solutions contain a lithium salt, and examples of the lithium salt which may be used in the present invention include, but are not particularly limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Also, examples of the organic electrolyte solutions which may be used in the present invention include ethylene carbonate, propylene carbonate, butylene carbonate, vinylene carbonate, diethyl carbonate, dimethyl carbonate, ethyl methyl carbonate, γ-butyrolactone, sulfolane, methyl acetate, and methyl propionate, but are not particularly limited thereto.

Preferably, the open-structured inner current collector is in the form of a wound wire or a mesh, but the present invention is not particularly limited thereto.

Also, the outer current collector is preferably in the form of a pipe, a wound wire or a mesh, but the present invention is not particularly limited thereto.

The inner current collector is not particularly limited to its kinds, but is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may be selected from polyacetylene, polyaniline, polypyrrole, polythiophene, polysulfurnitride, and a mixture thereof. However, the non-conductive polymer used in the current collector is not particularly limited to its kinds.

In the present invention, the outer current collector is not particularly limited to its forms, but is preferably in the form of a pipe, a wound wire or a mesh. The outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Al, Pd/Ag, Cr, Ta, Cu, Ba or ITO; or a carbon paste comprising carbon powders of graphite, carbon black or carbon nanotube.

The inner electrode may be an anode and the outer electrode may be a cathode. Alternatively, the inner electrode may be a cathode and the outer electrode may be an anode.

In the present invention, the electrode active material layer allows ions to migrate through the current collector, and the migration of ions is caused by the interaction of ions such as intercalation/deintercalation of ions into and from the electrolyte layer.

Such an electrode active material layer may be divided into an anode active material layer and a cathode active material layer.

Specifically, the cathode active material layer may be made of a cathode active material such as a lithium-containing transfer metal oxide, for example, any one selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0<y≤1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$, $LiFePO_4$ and mixtures thereof. Also, besides such an oxide, sulfides, selenides and halides may be used.

In addition, the anode active material layer may be made of an active material selected from a carbon-based material which can conventionally intercalate and disintercalate lithium ions, lithium-titanium complex oxide (LTO), and metals (Me) including Si, Sn, Li, Zn, Mg, Cd, Ce, Ni and Fe; alloys of the metals; oxides (MeOx) of the metals; complexes of the metals and carbon; and mixtures thereof. The carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum or coal tar pitch derived cokes. The anode may comprise a binder. As the binder, various kinds of binder polymers including vinylidene fluoride-hexafluoropropylene copolymer (PVDF-co-HFP), polyvinylidene fluoride, polyacrylonitrile and polymethylmethacrylate may be used.

Hereinafter, the specific structure of the cable-type secondary battery having a polymer electrolyte film according to the present invention will be briefly explained with reference to FIGS. 3 and 4.

Figure 3:
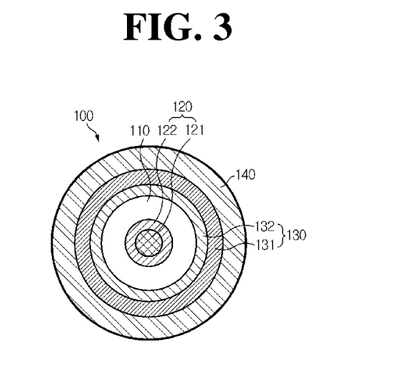
FIG. 3 shows a cross-section of a cable-type secondary battery according to a preferred embodiment of the present invention.

Referring to FIG. 3, the cable-type secondary battery 100 of the present invention comprises an inner electrode 120 having an open-structured inner current collector 121 and an inner electrode active material layer 122 formed on the surface of the inner current collector 121; an electrolyte layer 110 which becomes an ion path; an outer electrode 130 having an outer electrode active material layer 132 surrounding the outer surface of the electrolyte layer and an outer current collector 131 surrounding the outer electrode active material layer; and a protection coating 140 disposed to surround the outer electrode.

Figure 4:
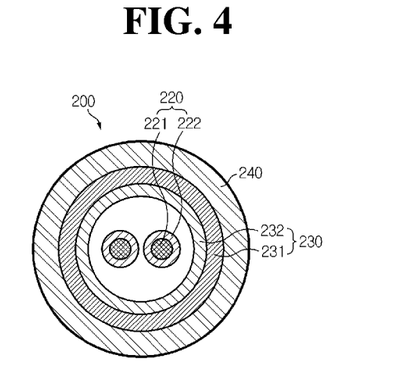
FIG. 4 shows a cross-section of a cable-type secondary battery according to another preferred embodiment of the present invention.

Also, referring to FIG. 4, the present invention provides a cable-type secondary battery 200 having two or more inner electrodes 220.

Such a plurality of inner electrodes 220 may be used with an outer electrode 130, 230 having a pipe, a wound wire or a mesh-formed current collector, to increase a contact area, thereby providing high battery rate. Also, the number of the inner electrodes may be adjusted, thereby allowing the easy control of capacity balance between the inner electrodes and the outer electrode.

In such a cable-type secondary battery, the outer electrode 130 may be obtained by forming the outer electrode active material layer 132, 232 on the outer current collector 131, 231 by way of coating. Preferably, the coating is carried out by extrusion-coating an electrode slurry comprising an active material on the current collector using an extruder. The outer of the inner electrode 120, 220 is coated with the polymer electrolyte film layer 110, 210. Thus, after forming the inner electrode and the electrolyte layer 110, 210, the outer electrode 130, 230 and the protection coating 140, 240 may be formed thereon. At this time, as mentioned above, the inner electrode may be an anode and the outer electrode, a cathode, or alternatively, the inner electrode may be a cathode and the outer electrode, an anode.

In the present invention, the protection coating 140, 240 is an insulator and is formed on the outermost surface for the purpose of protecting the electrodes against moisture in the air and external impacts. As the protection coating, conventional polymer resins, for example, PVC, HDPE and epoxy resins may be used.

Hereinafter, various preferred examples of the present invention will be described in detail for better understanding. However, the examples of the present invention may be modified in various ways, and they should not be interpreted as limiting the scope of the invention. The examples of the present invention are to provide better understanding of the invention to persons having ordinary skill in the art.

EXAMPLE

Preparation Example 1

First Electrolyte Layer

Several organic electrolyte solutions (1M $LiPF_6$, ethylene carbonate (EC)/propylene carbonate (PC)=1/1) (EL) were each mixed with PVdF-HFP so that each amount thereof becomes 30, 40, 50, 60, 70 and 80 wt % relative to PVdF-HFP. Acetone was used as a solvent for dissolving the polymer. Then, the resulting mixtures were each casted on a glass, followed by drying, to prepare electrolyte films.

Figure 5:
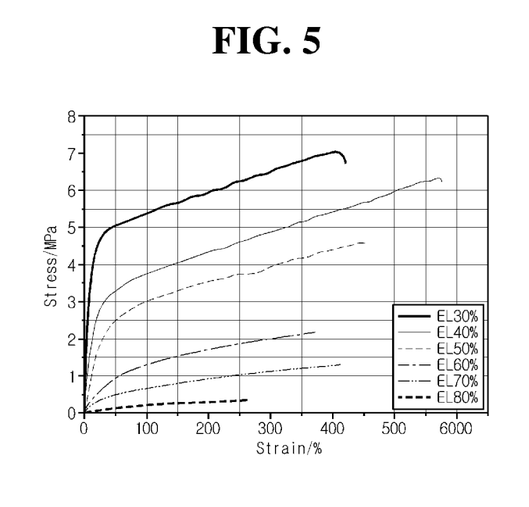
FIG. 5 is a graph showing the result of tensile strength measured for the polymer electrolyte film of Preparation Example 1.
Figure 6:
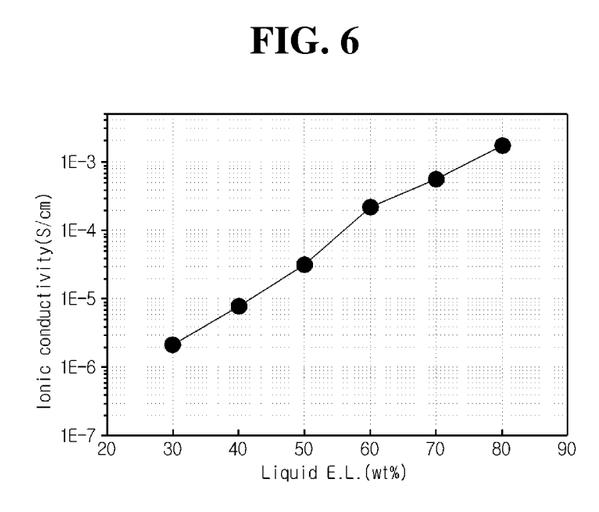
FIG. 6 is a graph showing the result of ionic conductivity measured for the polymer electrolyte film of Preparation Example 1.

The prepared electrolyte films were measured for their ionic conductivity and tensile strength, and the results thereof are shown in FIGS. 5 and 6.

Preparation Example 2

Second Electrolyte Layer

Mixtures were prepared according to the compositions listed in Table 1. To each mixture, benzoin as an UV initiator was added in an amount of 3 wt % relative to polyethylene glycol dimethacrylate (PEGDMA), and the resultants were each casted on a glass and exposed to UV radiation for 1 minute for polymerization, to prepare electrolyte films.

Figure 7:
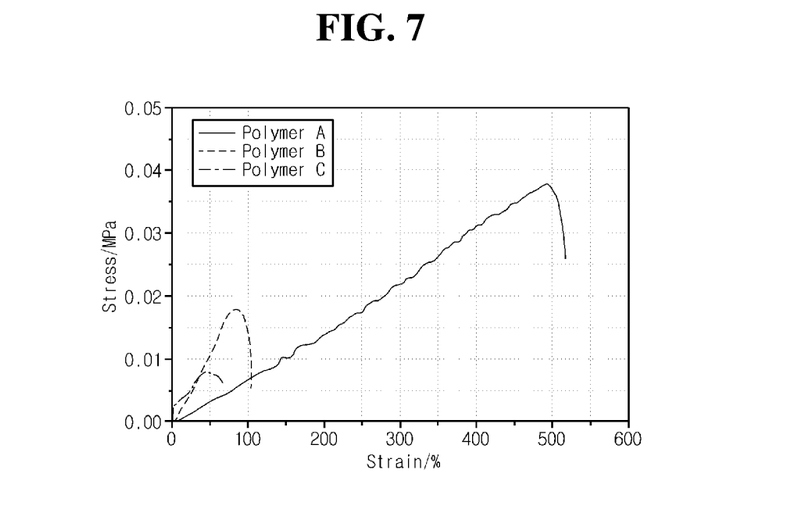
FIG. 7 is a graph showing the result of tensile strength measured for the polymer electrolyte film of Preparation Example 2.
Figure 8:
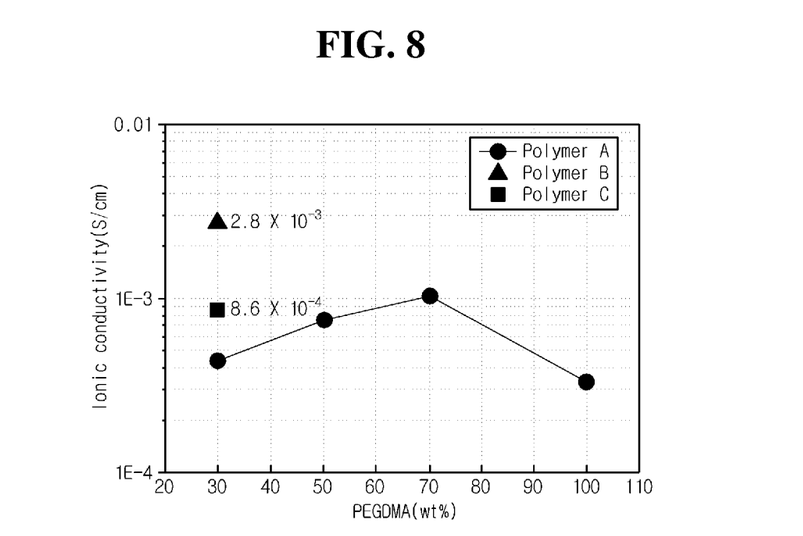
FIG. 8 is a graph showing the result of ionic conductivity measured for the polymer electrolyte film of Preparation Example 2.

The prepared electrolyte films were measured for their ionic conductivity and tensile strength, and the results thereof are shown in FIGS. 7 and 8.

TABLE 1

|  | Organic Electrolyte Solution (1M $LiPF_6$, EC/PC = 1/1) | Polyethylene Oxide (PEO) | Polyethylene Glycol Dimethacrylate (PEGDMA) |
|---|---|---|---|
| Polymer A (50 wt % of Organic Electrolyte Solution) | 50 | 35 | 15 |
| Polymer B (70 wt % of Organic Electrolyte Solution) | 70 | 21 | 9 |
| Polymer C (78 wt % of Organic Electrolyte Solution) | 78 | 15.4 | 6.6 |

Example 1

Multi-Layered Polymer Electrolyte Film

An organic electrolyte solution (1M $LiPF_6$, EC/PC=1/1) (EL) was mixed with PVdF-HFP in an amount of 30 wt % relative to PVdF-HFP. Acetone was used as a solvent for dissolving the polymer. Then, the resulting mixture was casted on a glass, followed by drying, to prepare a first electrolyte layer. In order to form a second electrolyte layer, to a mixture of an organic electrolyte solution (1M $LiPF_6$, EC/PC=1/1) (EL):PEO:PEGDMA=78:15.4:6.6 (wt %), benzoin as an UV initiator was added in an amount of 3 wt % relative to PEGDMA, and the resultant was casted on the first electrolyte layer prepared above, and exposed to UV radiation for 1 minute for polymerization. Thereby, a multi-layered polymer electrolyte film was prepared.

Figure 9:
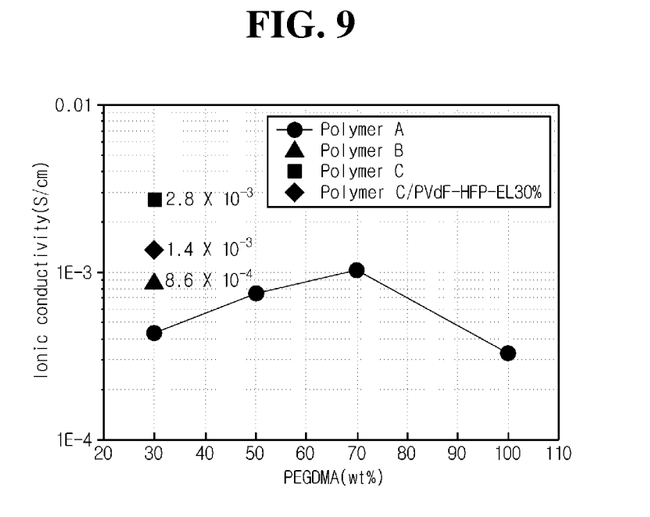
FIG. 9 is a graph showing the result of ionic conductivity measured for the polymer electrolyte film of Example 1.

The prepared polymer electrolyte film was measured for its ionic conductivity, and the results thereof are shown in FIG. 9.

As can be seen from the results of Preparation Examples 1 and 2, the first electrolyte layer had low ionic conductivity but good mechanical strength, while the second electrolyte layer had very low mechanical strength but superior ionic conductivity.

Meanwhile, the multi-layered polymer electrolyte film prepared in Example 1 exhibited good characteristics in terms of both ionic conductivity and mechanical strength due to a layered-structure of the first electrolyte layer and the second electrolyte layer, which compensate each other in their defects.

<Explanation of Reference Numerals>

| | |
|---|---|
| 10, 10': Multi-layered Polymer Electrolyte Film | 11: First Electrolyte Layer |
| 12: Second Electrolyte Layer | |
| 100, 200: Cable-type Secondary Battery | 110, 210: Electrolyte Layer |
| 120, 220: Inner Electrode | 121, 221: Inner Current Collector |
| 122, 222: Inner Electrode Active Material Layer | 130, 230: Outer Electrode |
| 131, 231: Outer Current Collector | |
| 132, 232: Outer Electrode Active Material Layer | |
| 140, 240: Protection Coating | |

What is claimed is:

1. A cable-type secondary battery, comprising:
    an inner electrode having an open-structured inner current collector and an inner electrode active material layer coated on the surface of the inner current collector;
    an electrolyte layer surrounding the inner electrode, the electrolyte layer being a polymer electrolyte film;
    an outer electrode having an outer electrode active material layer surrounding the outer surface of the electrolyte layer and an outer current collector surrounding the outer electrode active material layer; and
    a protection coating disposed to surround the outer electrode,
    wherein the polymer electrolyte film has a first electrolyte layer comprising a mixture of a first polymer and a first organic electrolyte solution in a weight ratio of 50:50 and 80:20; and a second electrolyte layer formed on at least one surface of the first electrolyte layer and comprising a mixture of a second polymer and a second organic electrolyte solution in a weight ratio of 20:80 and 50:50,
    wherein the first polymer is a non-crosslinked polar polymer selected from the group consisting of polyacrylonitrile, polyvinyl chloride, polyvinylidene fluoride, polyvinylidene fluoride-hexafluoropropylene copolymer, polyethyleneimine, polymethyl metacrylate, polybutyl acrylate, polyvinyl pyrrolidone, polyvinyl acetate, ethylene-vinyl acetate copolymer, and a mixture thereof, and
    wherein the second polymer is selected from a non-crosslinked polar polymer, a non-crosslinked oxide-based polymer, a crosslinked polymer structure, and a mixture thereof, wherein the non-crosslinked polar polymer is selected from the group consisting of polyacrylonitrile, polyvinyl chloride, polyvinylidene fluoride, polyvinylidene fluoride-hexafluoropropylene copolymer, polyethyleneimine, polymethyl metacrylate, polybutyl acrylate, polyvinyl pyrrolidone, polyvinyl acetate, ethylene-vinyl acetate copolymer, and a mixture thereof.

2. The cable-type secondary battery according to claim 1, wherein the non-crosslinked oxide-based polymer is selected from polyethylene oxide, polypropylene oxide, polyoxymethylene, polydimethylsiloxane and a mixture thereof.

3. The cable-type secondary battery according to claim 1, wherein the crosslinked polymer structure is a polymer consisting of a monomer having two or more functional groups or a polymer consisting of a monomer having two or more functional groups and a polar monomer having one functional group.

4. The cable-type secondary battery according to claim 3, wherein the monomer having two or more functional groups is selected from trimethylolpropane ethoxylate triacrylate, polyethylene glycol dimethacrylate, polyethylene glycol diacrylate, divinyl benzene, polyester dimethacrylate, divinyl ether, trimethylolpropane, trimethylolpropane trimethacrylate, ethoxylated Bisphenol A dimethacrylate, and a mixture thereof.

5. The cable-type secondary battery according to claim 3, wherein the polar monomer having one functional group is selected from methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, vinyl fluoride, and a mixture thereof.

6. The cable-type secondary battery according to claim 1, wherein the first organic electrolyte solution and the second organic electrolyte solution each independently contain a lithium salt.

7. The cable-type secondary battery according to claim 6, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and mixtures thereof.

8. The cable-type secondary battery according to claim 6, wherein the first organic electrolyte solution and the second organic electrolyte solution are each independently selected from ethylene carbonate, propylene carbonate, butylene carbonate, vinylene carbonate, diethyl carbonate, dimethyl carbonate, ethyl methyl carbonate, γ-butyrolactone, sulfolane, methyl acetate, methyl propionate, and a mixture thereof.

9. The cable-type secondary battery according to claim 1, wherein the inner electrode is formed with two or more electrodes arranged in parallel to each other.

10. The cable-type secondary battery according to claim 1, wherein the inner electrode is an anode and the outer electrode is a cathode, or the inner electrode is a cathode and the outer electrode is an anode.

11. The cable-type secondary battery according to claim 1, wherein the open-structured inner current collector is in the form of a wound wire or a mesh.

12. The cable-type secondary battery according to claim 1, wherein the open-structured inner current collector further comprises a core for supplying lithium ions, the core comprising an electrolyte therein.

13. The cable-type secondary battery according to claim 1, wherein the outer current collector is in the form of a pipe, a wound wire or a mesh.

\* \* \* \* \*